(12) United States Patent
Metz et al.

(10) Patent No.: US 11,852,141 B2
(45) Date of Patent: Dec. 26, 2023

(54) SCREW SPINDLE PUMP

(71) Applicant: LEISTRITZ PUMPEN GMBH, Nuremberg (DE)

(72) Inventors: Jürgen Metz, Feucht (DE); Kristin Lissek, Fürth (DE); Florian Popp, Nuremberg (DE)

(73) Assignee: LEISTRITZ PUMPEN GMBH, Nuremberg (DE)

( * ) Notice: Subject to any disclaimer, the term of this patent is extended or adjusted under 35 U.S.C. 154(b) by 0 days.

(21) Appl. No.: 18/076,912

(22) Filed: Dec. 7, 2022

(65) Prior Publication Data
US 2023/0184245 A1 Jun. 15, 2023

(30) Foreign Application Priority Data
Dec. 14, 2021 (DE) ...................... 10 2021 133 112.9

(51) Int. Cl.
| | | |
|---|---|---|
| F04C 2/16 | (2006.01) | |
| F04C 15/00 | (2006.01) | |
| F04C 15/06 | (2006.01) | |
| B60H 1/00 | (2006.01) | |

(52) U.S. Cl.
CPC ............ F04C 2/16 (2013.01); F04C 15/0023 (2013.01); F04C 15/06 (2013.01); B60H 1/00278 (2013.01); F04C 2240/30 (2013.01)

(58) Field of Classification Search
CPC ........ F04C 2/16; F04C 15/06; F04C 2240/60; F04C 18/16; F04C 2240/30
See application file for complete search history.

(56) References Cited

U.S. PATENT DOCUMENTS

| | | | |
|---|---|---|---|
| 11,319,953 B2* | 5/2022 | Richter | .................... F04C 15/06 |
| 2015/0369239 A1* | 12/2015 | Nuss | .......................... F04C 2/16 |
| | | | 418/201.1 |
| 2022/0018345 A1 | 1/2022 | Nickel | |
| 2022/0049697 A1* | 2/2022 | Pawellek | .................. F04C 2/16 |
| 2022/0333597 A1* | 10/2022 | Pawellek | ................ F01C 21/10 |

FOREIGN PATENT DOCUMENTS

| | | |
|---|---|---|
| DE | 3920900 A1 | 1/1991 |
| DE | 102018130472 A1 | 6/2020 |
| DE | 102018131587 A1 | 6/2020 |
| DE | 102019128602 B3 | 2/2021 |
| WO | 2019072895 A1 | 4/2019 |
| WO | WO-2019072887 A1 * | 4/2019 ............. B29C 65/08 |

OTHER PUBLICATIONS

German Office Action dated Sep. 8, 2022, 7 Pages.

* cited by examiner

*Primary Examiner* — Anthony Ayala Delgado
(74) *Attorney, Agent, or Firm* — LUCAS & MERCANTI, LLP; Klaus P. Stoffel

(57) ABSTRACT

A screw spindle pump having a spindle housing, in which a drive spindle and at least one running spindle which meshes therewith are received in spindle bores, and having an outer housing which encloses the spindle housing and on which an axial inlet port and a radial outlet port are provided, wherein the spindle housing has an axial fluid outlet for the fluid delivered through the spindle housing by the drive spindle and the running spindle, which axial fluid outlet communicates with a fluid chamber, which is formed between the spindle housing and the outer housing, extends around 360°, and in turn communicates with the radial outlet port.

15 Claims, 5 Drawing Sheets

SCREW SPINDLE PUMP

CROSS-REFERENCE TO RELATED APPLICATIONS

The present application claims priority of DE 10 2021 133 112.9, filed Dec. 14, 2021, the priority of this application is hereby claimed, and this application is incorporated herein by reference.

BACKGROUND OF THE INVENTION

The invention relates to a screw spindle pump having a spindle housing, in which a drive spindle and at least one running spindle which meshes therewith are received in spindle bores, and having an outer housing which encloses the spindle housing and on which an axial inlet port and a radial outlet port are provided.

Such a screw spindle pump serves to deliver a fluid and is used in a very wide variety of fields. An example that can be cited is the delivery of a fuel or another operating or supply fluid, for example a coolant or cleaning agent, for a motor vehicle. Such screw spindle pumps can also be used in other land vehicles or aircraft, such as e.g. airplanes or drones, the possible uses not being restricted thereto. Such a screw spindle pump has a spindle housing, which can also be referred to as inner housing, in which at least two spindles, specifically a drive spindle and a running spindle, are received in respective spindle bores which do, however, intersect one another. The drive spindle and the running spindle each have a spindle profile, the two spindle profiles meshing with one another. The drive spindle is connected to a drive motor and can be actively rotated, this also leading to a rotation of the meshing running spindle. As a result of the spindle rotation, a delivery volume is continuously displaced in the direction of the spindle longitudinal axis, in which delivery volume the fluid is delivered. The spindle housing is received in an outer housing which for example may be pot-like and may be terminated on one side by an axial wall, while the drive motor, for example, is flange-mounted on the other side. However, it is also conceivable for the outer housing to have multiple parts and comprise a cylindrical base part terminated on the one side by a cover, while the drive motor in turn is flange-mounted on the other side. The outer housing has an axial inlet port, that is to say a corresponding connection fitting, to which a feed line can be connected, whereby the suction side is defined. It also has a radial outlet port, that is to say a corresponding outlet fitting, by way of which the pressure side is defined. There, the delivered fluid exits at the particular pressure that can be generated by the pump. A pump of this type is described, for example, in DE 10 2018 131 587 A1.

In the case of the known pump, an axial inlet port provided eccentrically on the outer housing is provided, through which the inflow is effected. The fluid then flows first of all laterally toward an axial inlet opening in the spindle housing, is delivered through it and leaves the spindle housing at a radial housing bore, from where it flows to the radial outlet port through a narrow connecting space between the spindle housing and the outer housing. In the region of this radial outlet bore in the spindle housing and the narrow connecting space, that is to say the pressure side, the delivered fluid is present at a correspondingly high pump pressure, and therefore locally a high pressure applies load to the spindle housing or in the intermediate housing region in which the narrow connecting space is provided.

SUMMARY OF THE INVENTION

The invention is based on the problem of specifying a screw spindle pump which is improved by contrast.

To solve this problem, according to the invention a screw spindle pump as described in the introduction is provided, in which the spindle housing has an axial fluid outlet for the fluid delivered through the spindle housing by the drive spindle and the running spindle, which axial fluid outlet communicates with a fluid chamber, which is formed between the spindle housing and the outer housing, extends around 360°, and in turn communicates with the radial outlet.

In the case of the screw spindle pump according to the invention, it is particularly advantageous for a radial fluid chamber which runs 360° around the spindle housing, thus surrounding the latter in the form of an annular chamber, to be provided between the spindle housing and the outer housing. This annular fluid chamber lies on the pressure side, and is therefore a pressure chamber, since the pressurized fluid exiting the spindle housing is supplied to it. This fluid exits the spindle housing axially, that is to say that a correspondingly large, axial fluid outlet opening is provided on the spindle housing, with the result that the fluid delivered axially along the spindle set can exit axially without problems. Radial bores or similar configurations do not need to be provided on the spindle housing side. The axial fluid outlet of the spindle housing communicates with the radial fluid or pressure chamber, that is to say that the pressurized fluid is suitably deflected and supplied to the radial fluid chamber.

Since, as described, this radial fluid or pressure chamber reaches around the inner housing completely, that is to say encircles it around 360°, it is particularly advantageous for the corresponding pump pressure to be present on all sides around the inner housing, that is to say that ultimately almost symmetrical pressure conditions are provided at the spindle housing or apply load thereto. On the one hand, this avoids local excessive increases in pressure, as result from an unsymmetrical pressure distribution as is known from the prior art. On the other hand, deformations of the spindle housing that, although they are small, are also produced as a result of the fluid pressure building up in the spindle housing, are avoided, since the spindle housing as described is subjected to load radially outwardly from the fluid pressure prevailing in the fluid chamber and is therefore stabilized. That is to say, according to the invention, particularly advantageously a fluid jacket which forms a corresponding radial pressure stabilizing the inner housing is realized. This is advantageous in particular when the spindle housing is manufactured from a somewhat softer material, for example a plastic, this entirely possibly being the case for smaller screw spindle pumps which, however, can nevertheless generate correspondingly high pump pressures.

The fluid chamber provided according to the invention extends as described on the one hand 360° around the spindle housing. On the other hand, it should reach around the spindle housing over at least part of its axial length. In this respect, the fluid chamber should extend over at least half the length of the spindle bore or of the spindle housing, if appropriate even longer than that, for example over approximately ⅔ of the length of the spindle bores or the spindle housing. It is also conceivable for the fluid chamber to extend over the entire length of the spindle bores or of the spindle housing. On account of the axial exit of the fluid from the spindle housing, this leading, among other things, to the reduction of some flow noises and therefore also being advantageous, and on account of the necessary deflection in the direction of the fluid chamber, the fluid chamber ultimately begins at the pressure-side end of the spindle housing and then, as viewed axially, extends to the suction-side end, with the fluid chamber extending over at least half the length, preferably even longer than that, of the spindle housing.

The spindle housing should correspondingly be mounted in the outer housing, as of course it is also necessary to correspondingly seal the fluid chamber as viewed axially. To that end, different configuration options are conceivable. According to a first alternative, the fluid chamber may be axially delimited by two radial flanges, wherein the one radial flange has multiple axial apertures, via which the fluid chamber is connected to the fluid outlet of the spindle housing. The spindle housing is received and radially supported in the outer housing via these radial flanges. The radial flange provided on the pressure side has corresponding apertures which make it possible for the fluid flowing axially out of the spindle housing to be able to flow axially, as it were, back into the fluid chamber after it has been deflected. It is of course not necessary to provide sealing on this side. The other radial flange, provided as it were on the suction side, by contrast serves as a seal, for which purpose in this region one or more suitable sealing means are provided which seal the spindle housing with respect to the outer housing, with the result that the fluid chamber is also sealed at this suction-side end.

As an alternative to forming two radial flanges, it is also conceivable for the fluid chamber to be axially delimited on one side by a radial flange, which has multiple axial apertures via which the fluid chamber is connected to the fluid outlet of the spindle housing, and on the other side by a cover component. Here, use is made only of one radial flange provided on the pressure side, which, in the case of the embodiment presently being described, too, has axial apertures in order to make it possible for the delivered pressurized fluid to be able to flow back into the fluid chamber. The other side of the fluid chamber is closed or delimited by a cover component fitted on the cylindrical base part of the outer housing. While thus, in the case of the first variant, the suction-side radial flange delimits the chamber, in the case of the second variant the cover component axially delimits the chamber.

As described, the fluid flowing axially out of the spindle housing should be deflected and guided radially outward back into the fluid chamber. The fluid outlet is ultimately realized by the axially open side of the spindle housing, which preferably is received in the middle or center of the outer housing. In order to easily realize the deflection and backflow, an expedient refinement provides the arrangement of an intermediate component fitted on the outer housing and designed for the attachment of a drive motor, wherein one or more deflection cavities which deflect the fluid coming from the fluid outlet of the spindle housing toward the fluid chamber are formed on the intermediate component. This intermediate component, which may also be referred to as adapter or adapter flange, is on the one hand fitted axially on the outer housing and fixed thereto. On the other hand, it also forms the mounting interface for the drive motor fitted axially on the intermediate component, which drive motor runs by way of its drive shaft through the intermediate component to a suitable coupling, which couples the drive shaft to the drive spindle of the spindle set. According to the invention, on this intermediate component there are provided one or more deflection cavities, that is to say one or more recesses or depressions or spaces that are entered by the fluid flowing axially out of the spindle housing, that extend virtually radially outward, and that in turn communicate with the fluid chamber, for example via the multiple apertures provided on the pressure-side radial flange of the spindle housing. By way of this one deflection cavity or the multiple deflection cavities, it is possible to deflect the axially exiting fluid around the entire circumference, as it were, radially outward and axially back again into the fluid chamber, with the result that the inflow into the chamber is effected not only locally, but ultimately around the entire circumference of the chamber.

In this respect, the intermediate component may be sealed with respect to the drive motor or to the drive shaft running through the intermediate component, this being made possible by a shaft sealing ring, with the result that no fluid flows into the drive motor to cool it. In this case, the drive motor would be a dry-running rotor. If no seal, that is to say no shaft sealing ring, is provided, a small amount of the fluid can flow into the drive motor, circulate there and flow back again, with the result that this also makes it possible to cool the motor at the same time. In this case, the drive motor would be a wet-running rotor.

The interconnection of such an intermediate component is, however, not absolutely necessary. In that case, as an alternative, there is also the option for one or more deflection cavities which deflect the fluid coming from the fluid outlet of the spindle housing toward the fluid chamber to be provided on a housing of a drive motor to be fitted on the outer housing. In this case, the motor housing is fitted directly on the outer housing and connected thereto, with the result that the fluid exiting the spindle housing flows directly against the motor housing, on which the one deflection cavity or the multiple deflection cavities is/are formed. Here, too, there is the option in turn of configuring the drive motor as a dry-running rotor, in this case the drive shaft guided out of the motor housing being sealed on that side by a shaft sealing ring. In the case of a wet-running rotor configuration, no shaft seal would be provided there, with the result that a certain amount of fluid can flow into the drive motor for cooling purposes.

With preference, a deflection cavity in the form of an annular groove or pot-like depression is provided, which has a round configuration in the region of the groove or depression base. This means that the intermediate component or the end wall of the motor housing is configured with a corresponding annular groove running 360° around the circumference or a concave or spherical-cap-shaped depression, which enables deflection of the fluid on all sides. This easily ensures a symmetrical flow of fluid into the fluid chamber. Of course, the groove may also be subdivided into individual groove portions by axially and radially extending webs, if such webs must be provided e.g. for stabilization purposes.

The fluid chamber itself, as already described, is sealed with respect to the outer housing by one or more seal elements. This or these sealing elements may be provided at different positions depending on the design of the housing. If the fluid chamber is axially delimited at the suction-side end by a radial flange of the spindle housing, a first seal element may be received in a receiving groove on the radial flange, adjacent to the inlet port, of the spindle housing or of the outer housing and seal the spindle housing with respect to the outer housing. A second seal element serves as a seal on the pressure side. Here, different variants are conceivable.

Thus, a second seal element may be received in a receiving groove of the intermediate component and seal the intermediate component with respect to the outer housing. If such an intermediate component is not used, with the drive motor instead being flange-mounted directly on the outer housing, a second seal element may be received in a receiving groove of a motor housing of the drive motor and seal the motor housing with respect to the outer housing. Sealing rings of a suitable elastomer are expediently used as seal elements.

If, on the suction side, it is not a radial flange which provides the sealing or axial delimitation but instead a cover component, in an alternative pump configuration a first seal element may be received in a receiving groove on the spindle housing or on the cover component and seal the spindle housing with respect to the cover component. This produces a first sealing plane between the cover component and the spindle housing. Furthermore, a second seal element may be received in a receiving groove on the outer housing or on the cover component and seal the outer housing with respect to the cover component. This produces the second sealing plane between the cover component and the outer housing.

Two variants are also conceivable here for the purpose of pressure-side sealing, as already described in relation to the embodiment above. Thus, either a third seal element may be received in a receiving groove of the intermediate component or of the outer housing and seal the intermediate component with respect to the outer housing. If such an intermediate component is not used, a third seal element may be received in a receiving groove of a motor housing of the drive motor and seal the motor housing with respect to the outer housing.

As described, the fluid or pressure jacket realized according to the invention by the fluid chamber makes it possible to selectively generate a radial stabilization pressure on all sides of the spindle housing, in order to avoid broadening the tolerances on the spindle housing or any operation-related, small changes in geometry. This is the case in particular when the spindle housing is manufactured from plastic, as may be provided according to the invention. In addition or as an alternative, it is also conceivable to manufacture the outer housing, the intermediate component or/the cover component from plastic. That means that it is possible to manufacture all components relevant to the housing from plastic, just as furthermore, however, there is fundamentally also the option of manufacturing even the spindles from plastic. However, preferably at least they are made from metal.

As has already been described, the screw spindle pump may have a drive motor, which is coupled to the drive spindle by means of a drive shaft, and which either is in the form of a dry-running rotor, wherein the drive spindle is radially sealed by a shaft sealing ring, or is in the form of a wet-running rotor, wherein some of the fluid axially exiting the spindle housing flows along the drive shaft into the drive motor.

The screw spindle pump may be a 2-spindle pump, which has only one drive spindle and one running spindle positioned laterally with respect thereto. As an alternative, it is also conceivable for the screw spindle pump to be a 3-spindle pump, with a central drive spindle and two running spindles arranged offset by 180° on either side thereof. Thus, different types of pump with the fluid or pressure chamber according to the invention is around the inner housing can be realized.

Furthermore, it may be provided that the inlet port is arranged in line with a central axis of the spindle set comprising the drive spindle and the one or the two running spindles. That means that the inlet port is arranged virtually in the axial continuation of the central axis of the spindle set. In the case of a 2-spindle screw spindle pump, this central axis ultimately lies centrally between the drive spindle and the running spindle. In the case of a 3-spindle pump, this central axis lies in the longitudinal axis of the central drive spindle. This configuration especially advantageously makes it possible for the inflowing, axially drawn-in fluid within the outer housing not to require first being deflected toward the spindle housing, this possibly being linked with flow noises. Rather, a direct axial inflow from the inlet port into the spindle housing is possible.

In addition to the screw spindle pump itself, the invention also relates to the use of a screw spindle pump of the type described above in a motor vehicle for the purpose of delivering an operating liquid. This operating liquid may be of any desired nature. For example, it may be a cleaning liquid, for example a windscreen cleaning liquid, which is delivered by the pump. An alternative, and a preferred intended use according to the invention, is the use of the screw spindle pump as a coolant pump, which delivers a coolant. The coolant may be any desired fluid coolant. The use relates in particular to employment for delivering a coolant serving to cool an energy store. Such an energy store is increasingly being used in electromotively driven motor vehicles and is provided in the form of a correspondingly dimensioned traction or drive battery. The energy store necessitates corresponding cooling by means of a coolant, which can be delivered by the screw spindle pump according to the invention easily, in the amount required, and without problems.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
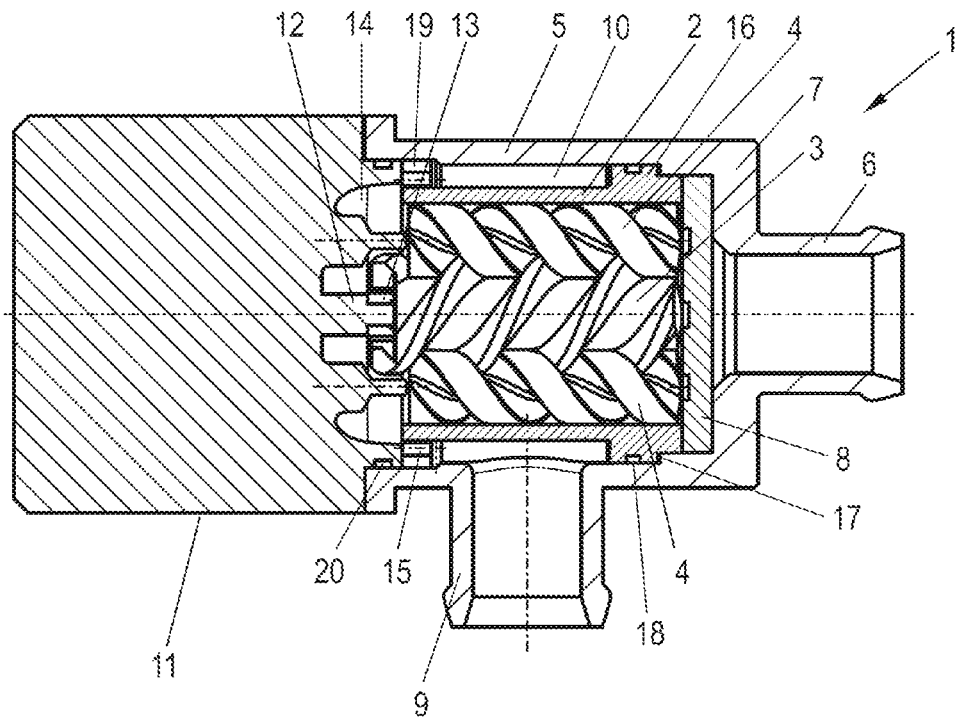
FIG. 1 shows a basic illustration of a first embodiment of a screw spindle pump according to the invention in a sectional view.

FIG. 1 shows a first embodiment of a screw spindle pump 1 according to the invention. It comprises a spindle housing 2, in which, in the example shown, three spindles are received, specifically a drive spindle 3 and two running spindles 4, which are positioned next to the drive spindle 3 laterally offset by 180° and are received in corresponding intersecting spindle bores. As shown in FIG. 1, all spindles have corresponding spindle profiles, which engage in one another and mesh with one another.

The spindle housing 2 is received in a pot-like outer housing 5, on which there is provided an inlet port 6, that is to say a corresponding connection fitting, which in this case is positioned centrally and in line with the longitudinal axis of the drive spindle 3. The spindle set composed of drive spindle 3 and running spindles 4 is axially supported with respect to the outer housing 5 or its radial flange 7 by a support element, here a feather key 8.

Furthermore provided on the outer housing 5 is a radial outlet port 9, also in this case a connection fitting, through which the pressurized fluid drawn in through the inlet port 6 radially exits again.

As shown illustratively in FIG. 1, the spindle housing 2 including its constituent parts is received inside the pot-shaped outer housing 5. A fluid chamber 10, which runs 360° around the circumference and, as shown in FIG. 1, extends over more than half the length of the spindle housing 2 or of the spindle bores, is provided between the outer wall of the inner housing 2 and the inner wall of the outer housing 5. The pressurized fluid exiting at the axial fluid outlet of the spindle housing 2 enters this fluid chamber 10, that is to say that the axial fluid outlet at the left-hand end of the spindle housing 2 communicates with the fluid chamber 10. For its part, said fluid chamber again communicates with the outlet port 9.

Furthermore provided is a drive motor 11, indicated only in a stylized manner here, which in this case is fitted directly on the outer housing 5 and fastened there. By way of a drive shaft 12, likewise illustrated only in a stylized manner, the drive motor 11 is coupled to the drive spindle 3 via a coupling element 13, with the result that the drive spindle can be actively rotated by the drive motor 11, and therefore the entire spindle set rotates and the fluid drawn in through the inlet port 6 is delivered axially.

As described, the fluid exits the axial fluid outlet of the spindle housing 2, which in this configuration is simply axially open at the pressure-side end. In order for the fluid to be able to enter the fluid chamber, which indeed is axially recessed with respect to the delivery direction, in the example shown a deflection cavity 14 may be provided, which in the example shown is formed directly on the housing wall of the drive motor 11 that faces the spindle housing 2. This deflection cavity 14, which will be discussed later on, is in the form for example of an annular groove around the circumference and has a curved or rounded configuration on the bottom, with the result that the fluid, which flows in virtually in the middle, is deflected radially outwardly to the side and guided back, and therefore it can enter the fluid chamber 10 through corresponding apertures 15 formed on a radial flange 19 of the spindle housing 2.

The fluid chamber 10 is axially delimited at the suction-side end by a radial flange 16 of the spindle housing 2. Said radial flange on the one hand is axially supported against a housing shoulder 17 of the outer housing. On the other hand, it extends as far as the inner wall of the outer housing 5 and is sealed with respect thereto by a seal element 18, with the result that the fluid chamber 10 is closed and sealed at this end. At the opposite, pressure-side end, there is likewise provided a radial flange 19, but in this radial flange the apertures 15 already described are formed, with the result that the fluid chamber 10 is open toward this pressure side and the pressurized fluid can flow into the fluid chamber 10 via the deflection cavity 14. The sealing on this side is effected between the outer housing 5 and the motor housing by a suitable seal element 20, so that overall a fluid-tight encapsulation is provided.

During operation, the drive spindle 3 is driven by the drive motor 11, with the result that the entire spindle set rotates. The fluid drawn in through the inlet port 6 is delivered axially in that the spindle profiles of the spindles 3, 4 engage in one another, with the result that axially displaced delivery volumes allowing the fluid to be delivered along the spindle set are produced.

The fluid axially exits at the pressure-side end of the spindle housing 2, this being advantageous in terms of operation which is as quiet as possible, since no appreciable flow noises are associated therewith. The fluid then directly enters the deflection cavity 14, as described for example an annular groove or concave depression, via which on the one hand it is channeled radially outward and axially guided back, that is to say is deflected counter to the delivery direction of the spindle set. The fluid enters the fluid chamber 10 through the apertures 15 and from there enters the outlet port 9, where it is discharged.

In the fluid chamber 10, as described, the pump pressure prevails, that is to say that, in this fluid chamber 10 surrounding the spindle housing 2 on all sides, the outlet pressure that can be generated by the screw spindle pump 1 is present. This pressure acts radially on all sides of the spindle housing 2, provided that it has the fluid chamber 10, which can also be referred to as pressure chamber, reaching around it. As described, this fluid chamber 10 extends over at least half the length of the spindle housing 2, preferably even somewhat longer than that, with the result that the spindle housing 2 is stabilized as best as possible with respect to any pressure-related changes in geometry or tolerance shifts. This applies in particular to the case in which the spindle housing 2 is manufactured from plastic, that is to say from a material somewhat softer than metal.

Figure 2:
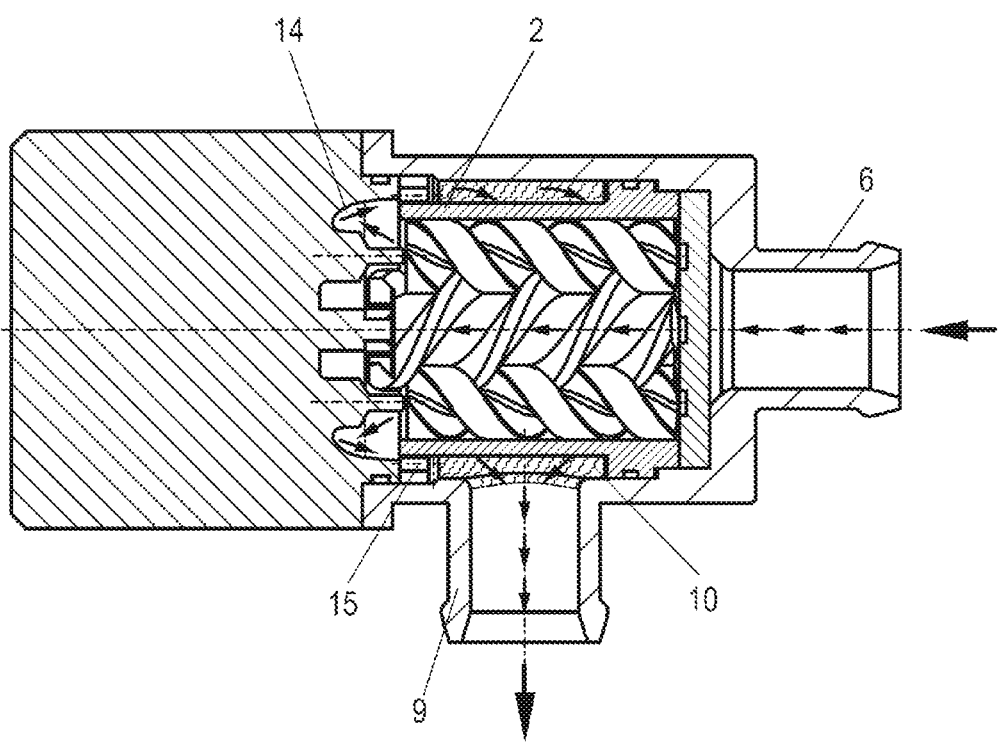
FIG. 2 shows the screw spindle pump from FIG. 1 with flow arrows depicted.

FIG. 2 shows the same illustration as FIG. 1, only in this figure flow arrows corresponding to the illustration of the flow of fluid are depicted. As shown in FIG. 2, the fluid, for example water, fuel, a coolant or the like, is drawn in at the inlet port 6 and delivered axially through the spindle housing 2 by the spindle set. It exits at the pressure-side end of the open spindle housing 2 and enters the deflection cavity 14, where, assisted by the geometry of this deflection cavity, which, as mentioned, is rounded on the bottom, it is deflected radially outward and counter to the inflow direction, with the result that it can flow axially back into the fluid chamber 10, which it fills on all sides, through the apertures 15. From this fluid chamber 10, the fluid then passes to the outlet port 9, where it then flows away under pressure.

Figure 3:
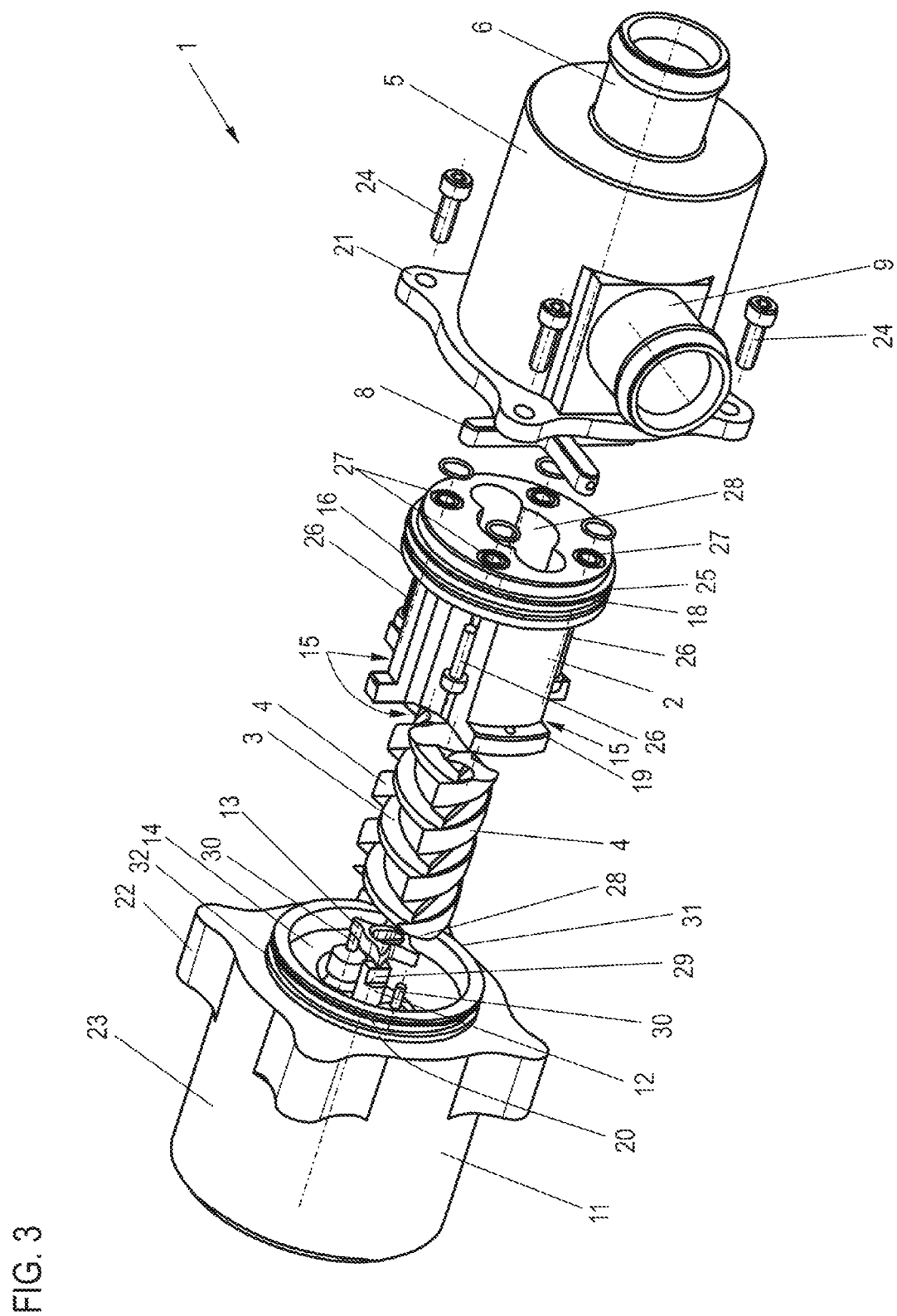
FIG. 3 shows an exploded illustration of the screw spindle pump from FIGS. 1 and 2.

An exploded view of the screw spindle pump 1 from FIGS. 1 and 2 is shown in FIG. 3. Starting from the right-hand side, what is shown is the outer housing 5 with its axial inlet port 6 and its radial outlet port 9, which has a mounting flange 21 at the end facing the drive motor 11 in the mounted position, which mounting flange is fastened by means of suitable fastening screws 24 to a corresponding mounting flange 22 on the motor housing 23 of the drive motor.

Next, the feather key 8, which here is cross-shaped and axially supports the drive spindle 3 and the running spindles 4, is shown. The cross-shaped configuration of the feather key 8 makes it possible to mount the spindle housing 2 in two alignments, offset by 90°, relative to the outer housing 5, with the spindles 3, 4 being axially supported on the feather key 8 in each of the two mounted positions.

Furthermore shown is the spindle housing 2 with its radial flange 16, on which is formed a corresponding receiving groove 25 in which the seal element 18 sealing the spindle housing with respect to the outer housing 5 in the mounted position is received. The spindle housing 2 is connected to the outer housing 5 by corresponding connecting screws 26, which engage through corresponding bores 27 in the radial flange 16 and are screwed into threaded bores, not shown in more detail, on the outer housing 5.

Furthermore shown are the drive spindle 3 and the two running spindles 4, which are inserted in the spindle bores 28 that, as shown in FIG. 3, intersect one another.

Also shown is the coupling element 13, which is inserted in a corresponding receptacle on the axial end face of the drive spindle 3 for conjoint rotation therewith and which has a corresponding insertion receptacle 28, in which an insertion pin 29 of the drive shaft 12 of the drive motor 11 engages, with the result that the drive shaft 12 is connected to the drive spindle 3 for conjoint rotation therewith. Further shown are two support bearings 30, which are provided on the motor housing 23, are in the form of axially projecting pins, and serve to axially support or bear the two running spindles 4. Furthermore shown is an axial flange 31, which is formed on the motor housing 23 and which has a corresponding radial groove 23, in which the seal element 20 that provides sealing with respect to the outer housing 5 is inserted.

The fluid chamber 10 is delimited toward the suction side by the radial flange 16, as described. Also shown is the radial flange 19, which, however, is open via the apertures 15, so that the fluid can flow from the deflection cavity 14, which is indicated on the motor housing 23, into the fluid chamber 10.

Figure 4:
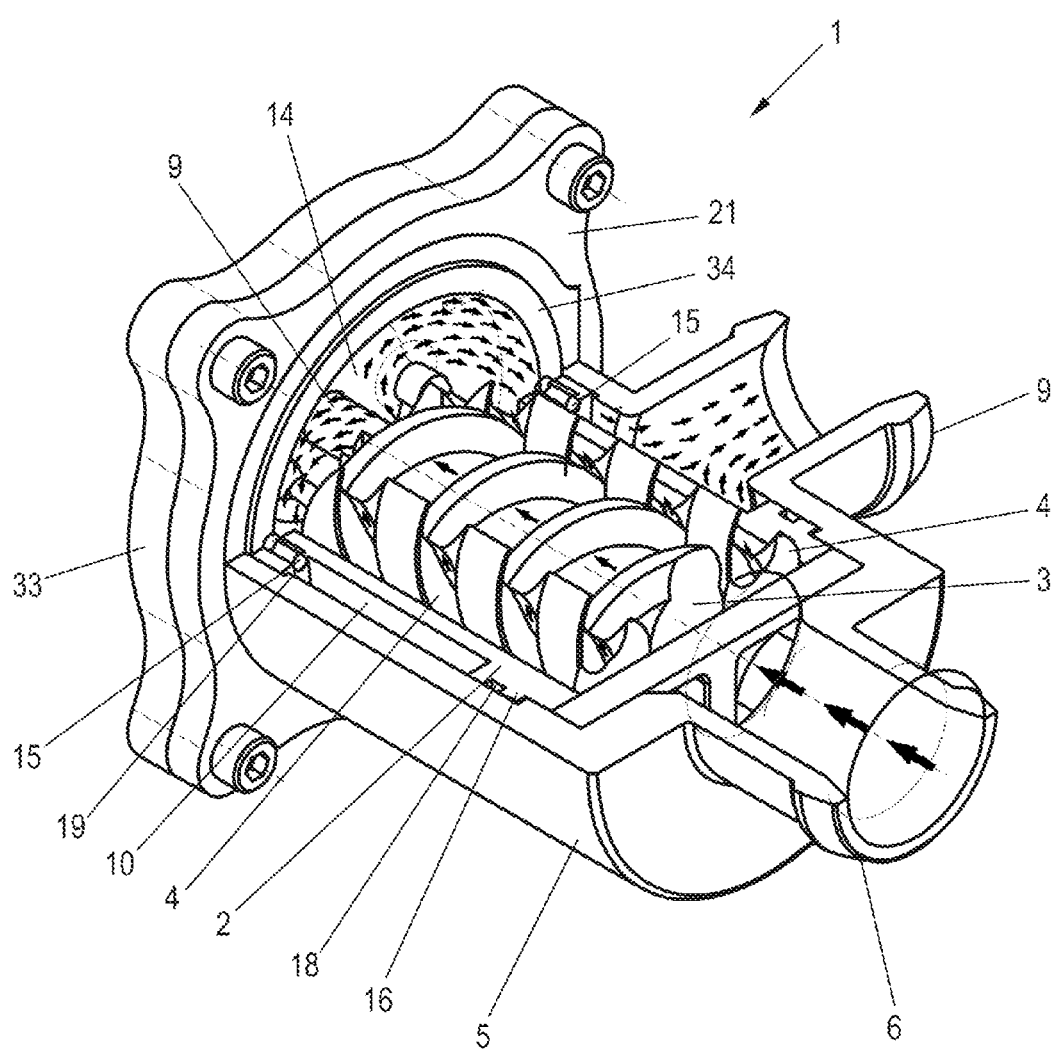
FIG. 4 shows a partial view of a further embodiment of a screw spindle pump according to the invention in a partially sectional perspective view.

FIG. 4 shows a partial view of a further embodiment of a screw spindle pump according to the invention, the structure of which corresponds to the configuration of FIGS. 1-3. What is provided in this case in turn is an outer housing 5 having an axial inlet port 6 and a radial outlet port 7, and a spindle housing 2 with drive spindle 3 and two running spindles 4 provided therein. Similarly formed in turn between the inner housing 2 and the outer housing 5 is a fluid chamber 10, which extends 360° around the spindle housing 2 and, as viewed axially, over at least half the length of the spindle housing. The sealing is effected on the suction side in turn by a corresponding radial flange 16 and a seal element 18 received in the groove 25.

By contrast to the configuration described above, in this case the motor housing 23 is not fitted directly on the mounting flange 21 of the outer housing 5, but rather in this variant an intermediate component 33 in the form of an intermediate plate placed between the mounting flange 21 and the mounting flange 22 is provided. The annular-groove-shaped or else spherical-cap-shaped deflection cavity 14 is formed on this intermediate component 33, which has a corresponding axial flange 34 by way of which it engages axially in the outer housing 5. The drive motor 11 engages by way of its drive shaft 9 in a corresponding bore in this intermediate component and, as already described, is coupled to the drive spindle 3 via a coupling element 13.

In this variant of the invention, the fluid deflection is accordingly realized by the plate-shaped intermediate component 33, on which the deflection cavity 14 is formed. This is in turn shaped in such a way that the fluid is delivered radially outward and deflected counter to the inflow direction, with the result that it can flow into the fluid chamber 10 through the corresponding apertures 15 in the radial flange 19 of the spindle housing 2, and in the fluid chamber 10 the corresponding stabilizing pressure can be built up.

Figure 5:
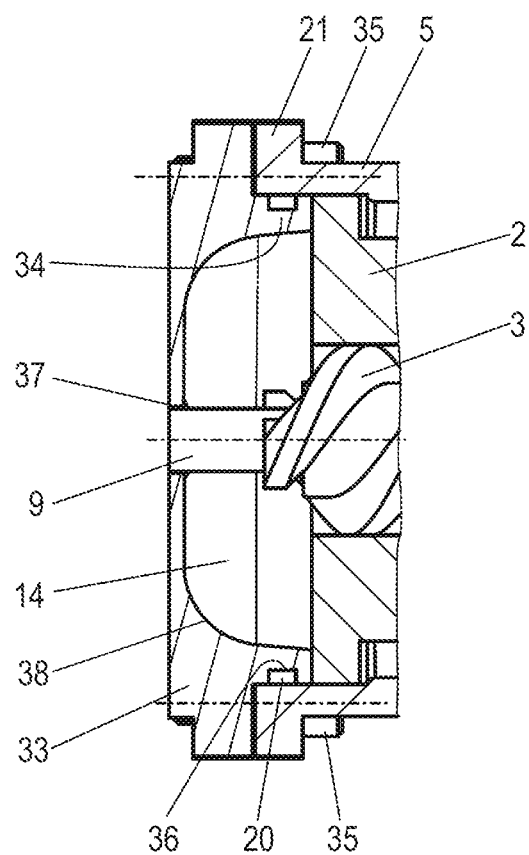
FIG. 5 shows a partial view of the arrangement of FIG. 4 in a longitudinal section through the intermediate component provided in this embodiment.
Figure 6:
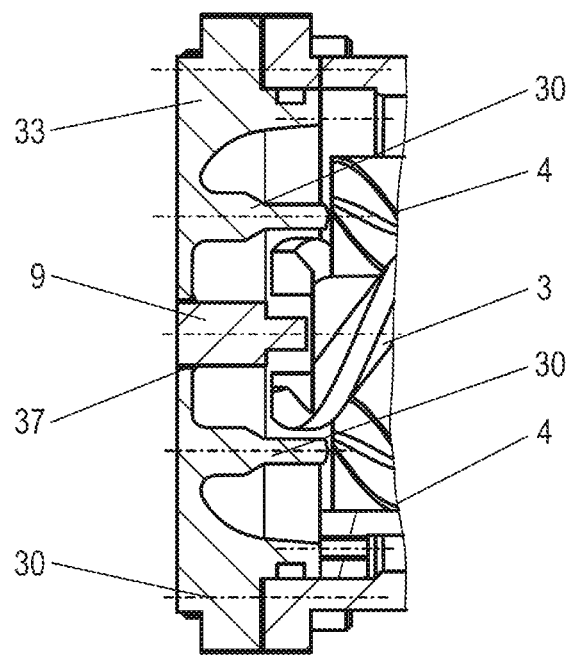
FIG. 6 shows a view corresponding to FIG. 5 in a cross section.

FIGS. 5 and 6 show two sectional views, offset by 90°, through the plate-shaped intermediate component 3. As shown, the intermediate component is screwed to the mounting flange 21 of the outer housing 5 by corresponding fastening screws 35, in this configuration the seal element 20 being received in a corresponding annular groove 36 formed on the axial flange 34 and providing sealing with respect to the outer housing 5.

Furthermore shown is the central bore 37, through which the drive shaft 9 engages. Here, too, the intermediate component 37 provides the function of a motor bearing, since the drive shaft is also ultimately mounted or guided in this bore 37. If a seal element in the form of a shaft sealing ring is present in this bore 37, then an axial throughflow, along the drive shaft 9, of the fluid flowing into the deflection cavity 14 is ruled out, and the drive motor 11 would be a dry-running rotor in that case. If there is no shaft sealing ring in the bore 37, a small amount of fluid can flow axially along the drive shaft 9 into the drive motor 11 and cool the latter.

In the sectional view shown in FIG. 5, the annular or spherical-cap shape of the deflection cavity 14 having a rounded bottom surface 38 which deflects the fluid can be clearly seen. The sectional plane in this case runs through the drive spindle 3, but not through the running spindles 4.

A sectional view rotated by 90° is shown in FIG. 6, and in this case the sectional plane runs through the drive spindle 4. This sectional view shows the two support bearings 30 in the form of support pins, these support bearings 30 in this case being integrally molded in one piece on the intermediate component 33. A running spindle 4 is axially supported on each support bearing 30.

Figure 7:
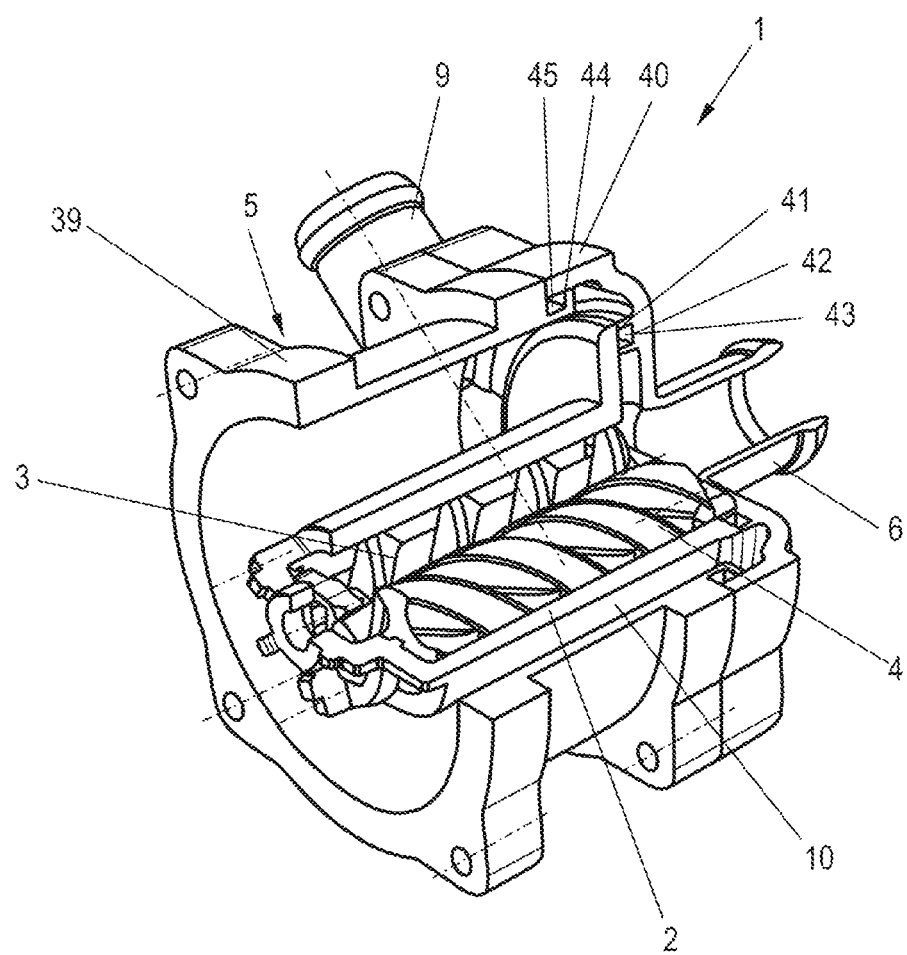
FIG. 7 shows a perspective view of a further embodiment of a screw spindle pump according to the invention.

Lastly, FIG. 7 shows a third embodiment of a screw spindle pump 1 according to the invention, comprising an outer housing 5, which in this case consists of a cylindrical base part 39 and a cover component 40 which is fitted axially thereon and terminates the outer housing 5 toward the suction side. The drive motor 11, which can be screwed to the base part 39 either directly or via an intermediate component 33, as likewise described above, is arranged on the opposite, pressure side.

Furthermore provided is a spindle housing 2, in which here only one drive spindle 3 and one running spindle 4 are received. Thus, by contrast to the configurations according to FIGS. 1-6, it is a 2-spindle pump. The fundamental operating principle, however, is the same.

In this case and in this configuration, the inlet port 6 is formed on the cover component 40, as is the outlet port 9. This means that the cover component 40 on the one hand forms the axial termination, but on the other hand also comprises the inlet port and the outlet port 6, 9.

For sealing purposes, in this case an axial flange 41 is formed on the cover component 40, having an annular groove 42 in which a seal element 43 in the form of a sealing ring is inserted. Axial sealing with respect to the spindle housing 2 is hereby provided.

A further sealing plane is provided between the cover component 40 and the base part 39. Formed in turn on the base part 39 is a radially open annular groove 44, in which a seal element 45 in the form of a sealing ring providing radial sealing with respect to the cover component 40 is received.

In this variant, too, a fluid chamber 10, running around the circumference of the spindle housing 2, on the suction side is axially delimited and sealed by these sealing structures. In this variant, this fluid chamber 10 extends over the entire length of the spindle housing 2, since, as already described in relation to the preceding embodiments, the fluid axially exits at the axially open, pressure-side end of the spindle housing 2 and is deflected again by the deflection cavity 14 and guided back into the fluid chamber 10. As described, the deflection cavity 14 may be formed either directly on the corresponding bottom wall of the motor housing 23, or on the plate-shaped intermediate part 33.

In any case, here, too, a corresponding pressure acting radially on all sides of the spindle housing 2 forms within the fluid chamber 10. Of course, the fluid chamber 10 in this case also communicates with the outlet port 9, as shown clearly in FIG. 7.

While specific embodiments of the invention have been shown and described in detail to illustrate the inventive principles, it will be understood that the invention may be embodied otherwise without departing from such principles.

We claim:

1. A screw spindle pump having a spindle housing, in which a drive spindle and at least one running spindle which meshes therewith are received in spindle bores, and having an outer housing which encloses the spindle housing and on which an axial inlet port and a radial outlet port are provided, wherein the spindle housing has an axial fluid outlet for the fluid delivered through the spindle housing by the drive spindle and the running spindle, which axial fluid outlet communicates with a fluid chamber, which is formed between the spindle housing and the outer housing, extends around 360°, and in turn communicates with the radial outlet port.

2. The screw spindle pump according to claim 1, wherein the fluid chamber extends over at least half the length of the spindle bore.

3. The screw spindle pump according to claim 1, wherein the fluid chamber either is axially delimited by two radial flanges, wherein the one radial flange has multiple axial apertures via which the fluid chamber is connected to the fluid outlet of the spindle housing, or in that the fluid chamber is axially delimited on one side by a radial flange, which has multiple axial apertures via which the fluid chamber is connected to the fluid outlet of the spindle housing, and on the other side by a cover component.

4. The screw spindle pump according to claim 1, wherein an intermediate component fitted on the outer housing and designed for the attachment of a drive motor is provided, wherein one or more deflection cavities which deflect the fluid coming from the fluid outlet of the spindle housing toward the fluid chamber are provided on the intermediate component.

5. The screw spindle pump according to claim 1, wherein one or more deflection cavities which deflect the fluid coming from the fluid outlet of the spindle housing toward the fluid chamber are provided on a housing of a drive motor fitted on the outer housing.

6. The screw spindle pump according to claim 4, wherein the one deflection cavity is an annular groove or pot-like depression, which has a round configuration in the region of the groove or depression base.

7. The screw spindle pump according to claim 1, wherein the fluid chamber is sealed with respect to the outer housing by one or more seal elements.

8. The screw spindle pump according to claim 3, wherein a first seal element is received in a receiving groove on the radial flange, adjacent to the inlet port, of the spindle housing or of the outer housing and seals the spindle housing with respect to the outer housing, and in that a second seal element is received in a receiving groove of the intermediate component and seals the intermediate component with respect to the outer housing, or in that a second seal element is received in a receiving groove of a motor housing of the drive motor and seals the motor housing with respect to the outer housing.

9. The screw spindle pump according to claim 3, wherein a first seal element is received in a receiving groove on the spindle housing or on the cover component and seals the spindle housing with respect to the cover component, in that a second seal element is received in a receiving groove on the outer housing or on the cover component and seals the outer housing with respect to the cover component, and in that a third seal element is received in a receiving groove of the intermediate component or of the outer housing and seals the intermediate component with respect to the outer housing, or in that a third seal element is received in a receiving groove of a motor housing of the drive motor and seals the motor housing with respect to the outer housing.

10. The screw spindle pump according to claim 1, wherein the spindle housing, the outer housing, the intermediate component and/or the cover component are made of plastic.

11. The screw spindle pump according to claim 1, wherein a drive motor is provided, which is coupled to the drive spindle by way of a drive shaft, and which either is in the form of a dry-running rotor, wherein the drive shaft is radially sealed by a shaft sealing ring, or is in the form of a wet-running rotor, wherein some of the fluid axially exiting the spindle housing flows along the drive shaft into the drive motor.

12. The screw spindle pump according to claim 1, wherein a central drive spindle and two running spindles arranged on either side of the drive spindle are provided.

13. The screw spindle pump according to claim 1, wherein the inlet port is arranged in line with a central axis of the spindle set comprising the drive spindle and the one or the two running spindles.

14. A method for delivering an operating liquid in a motor vehicle, comprising delivering the operating liquid using a screw spindle pump according to claim 1.

15. The method according to claim 14, including using the screw spindle pump as a coolant pump for delivering a coolant serving to cool an energy store.

* * * * *